United States Patent [19]
Thompson

[11] Patent Number: 5,330,842
[45] Date of Patent: Jul. 19, 1994

[54] SURFACE TREATED VESTIBULE BLOCK AND PROCESS OF MAKING THE SAME

[75] Inventor: David L. Thompson, 378 N. Via Porto, Anaheim, Calif. 92806

[73] Assignees: David M. Volz; David L. Thompson, Calif. ; a part interest

[21] Appl. No.: 853,032

[22] Filed: Mar. 17, 1992

[51] Int. Cl.⁵ ............................................. B32B 17/06
[52] U.S. Cl. ................... 428/426; 428/428; 428/446; 428/688; 428/697; 428/699; 428/908.8; 501/6; 501/32; 501/123; 501/153; 501/154
[58] Field of Search ...................... 501/6, 32, 94, 123, 501/153, 154; 428/428, 432, 446, 697, 699, 908.8, 688, 426, 701, 702; 432/156, 262, 264, 265

[56] References Cited

U.S. PATENT DOCUMENTS

| | | | |
|---|---|---|---|
| 1,869,237 | 7/1932 | Bruhn | 432/428 |
| 2,182,675 | 12/1939 | Morton | 263/46 |
| 2,438,559 | 3/1948 | Hubbell | 266/43 |
| 3,449,084 | 6/1969 | Smoot et al. | 23/277 |
| 3,669,640 | 6/1972 | Brichard et al. | 65/182 |
| 3,878,005 | 4/1975 | Warren et al. | 156/2 |
| 4,105,492 | 8/1978 | Foley et al. | 156/629 |
| 4,191,528 | 3/1980 | Boggum et al. | 432/248 |
| 4,253,417 | 3/1981 | Valentijn | 118/733 |
| 4,278,422 | 7/1981 | Thompson | 432/188 |
| 4,279,845 | 7/1981 | Maisonnave | 264/30 |
| 4,460,654 | 7/1984 | Interrante | 428/428 |
| 4,656,146 | 4/1987 | Schlett et al. | 501/124 |
| 4,943,234 | 7/1990 | Sohlbrand | 432/152 |

OTHER PUBLICATIONS

Norton, "Refractories", Third Edition, McGraw Hill, 1949, pp 392-454.

Primary Examiner—Mark L. Bell
Assistant Examiner—Michael Marcheschi
Attorney, Agent, or Firm—Klein & Szekeres

[57] ABSTRACT

A vestibule block or interior furnace wall utilized in a diffusion furnace for manufacturing semi-conductors, integrated circuits and the like, and which is made of refractory or ceramic material, is treated on its surface with a suspension of fine particulate of a glass frit composition comprising an alkali earth metal alumino silicate, and is thereafter heated above the transition temperature of the alkali earth metal alumino silicate. Vestibule blocks and interior surface walls which have been treated in the above-described manner are highly abrasion resistant on their surface, generate virtually no particulate matter under conditions of ordinary use in the semi-conductor manufacturing processes, and generate significantly less particulate matter when tested in an abrasion test against vestibule blocks of the prior art.

14 Claims, 2 Drawing Sheets

SURFACE TREATED VESTIBULE BLOCK AND PROCESS OF MAKING THE SAME

BACKGROUND OF THE INVENTION

1. Field of the Invention

The present invention is in the field directed to components of furnaces used for manufacturing semi-conductors, integrated circuits and the like. More specifically, the present invention is directed to a vestibule block which is surface treated so as to generate virtually no particulate matter during normal use, and to the process of making such a surface treated vestibule block.

2. Brief Description of the Prior Art

The process of manufacturing semi-conductors integrated circuits and the like includes one or more steps where wafers of silicon are heated in a furnace while exposed to certain gases which bring about desired chemical/and physical transformation on the surface of the wafers. For example, certain gases which contain boron or arsenic are admixed with a suitable inert gas and are introduced into the furnace where they decompose and deposit certain desired elements (such as elemental boron or arsenic) on the surface of the wafers. As is well known in the art, the presence of trivalent boron or pentavalent arsenic in the tetravalent silicon material is principally responsible for the desired electrical characteristics of these devices. During the above-mentioned and like manufacturing processes (such as oxidation, polycrystalline and amorphous silicon deposition and the like) the silicon wafers are deposited and held in a suitable quartz tube, which is commonly called "diffusion tube" in the trade. Walls of the furnace are usually made of refractory or ceramic material. Typically, holes or openings are provided in two oppositely disposed walls of the furnace, and a substantially cylindrical body having a step down section, is inserted into these holes. The substantially cylindrical body having the step down section is known in the art as a "vestibule block". The vestibule block itself has an inner annulus into which the diffusion tube is placed. For a long time it was the practice in the prior art to place packing material of rock wool or glass wool around the diffusion tube to close the gap between the annulus of the vestibule block and the diffusion tube and to align the diffusion tube within a heating coil which is in the furnace. A serious disadvantage of this practice was that rock wook or glass wool generates dust (particles), which has a deleterious effect on the manufacturing process.

More specifically, as is well known in the art, the semi-conductor manufacturing process must be performed in as particle-free environment as possible. This is because the semi-conductors and integrated circuits which have been contaminated by inadvertent deposit of particles on the silicon wafers during the manufacturing process are usually defective. This disadvantage of using rock wool or glass wool for packing material has been overcome by my invention described in U.S. Pat. No. 4,278,422, in accordance with which a heat withstanding support collar is placed around the diffusion tube and within the opening of the vestibule block. Thus, the above-mentioned diffusion tube support collar of U.S. Pat. No. 4,278,422 represented a major success in the industry's efforts to reduce defects due to dust or particles in the semi-conductor manufacturing process. The state-of-the-art nonetheless continues to experience problems with dust or particulate matter which abrades from the vestibule block and/or the ceramic or refractory walls of the furnace itself. In other words, particles generated by abrasion of the vestibule blocks and/or of the walls of the furnace during the manufacturing process still cause a certain number of defective semi-conductors. The present invention is intended to eliminate or at least minimize the just-noted problem.

As still further background to the present invention the following U.S. Pat. Nos., which are directed to the composition, construction or treatment of furnaces and furnace walls, are of interest: 4,943,234, 4,656,146, 4,279,845, 4,253,417, 4,191,528, 4,105,492, 3,878,005, 3,669,640, 3,449,084, 2,438,559.

SUMMARY OF THE INVENTION

It is an object of the present invention to provide a vestibule block and interior walls of a furnace used in the process of manufacturing semi-conductors, integrated circuits and the like, which vestibule block and walls generate only minimal amount of particulate matter on abrasion.

It is another object of the present invention to provide a process for surface treating vestibule blocks and interior walls of furnaces used in the process of manufacturing semi-conductors, integrated circuits and the like, so that the surface treated vestibule blocks and walls generate only minimal amount of particulate matter on abrasion.

The foregoing and other objects and advantages are attained by a vestibule block or interior furnace wall which is made of refractory or ceramic material and which has been treated on its surface with a suspension of fine particulate of a glass frit composition comprising alkali earth metal alumino silicate (preferably calcium alumino silicate) and which is thereafter heated above the transition point of the alkali earth metal alumino silicate. Optionally, the treatment of the surface with the suspension of glass frit and subsequent heating is repeated. Still further, prior to applying the suspension of glass frit to the surface of the vestibule block or interior furnace wall, the vestibule block or interior furnace wall is optionally surface treated with a colloidal suspension of alumina, and is thereafter heated to approximately 1250° to 1300° C. Vestibule blocks and interior surface walls which have been treated in the above-described manner are highly abrasion resistant on their surface, generate virtually no particulate matter under conditions of ordinary use in the semi-conductor manufacturing processes, and generate significantly less particulate matter when tested in an abrasion test against vestibule blocks of the prior art.

The features of the present invention can be best understood together with further objects and advantages by reference to the following description, taken in connection with the accompanying drawings, wherein like numerals indicate like parts.

DESCRIPTION OF THE PREFERRED EMBODIMENTS

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
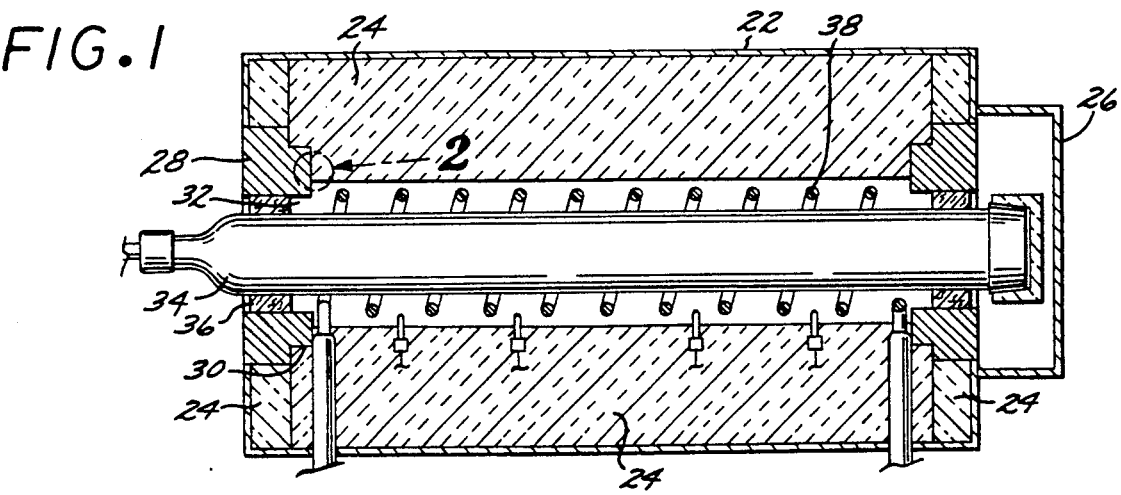
FIG. 1 is a cross-sectional view of a furnace typically used for the manufacturing of semi-conductors, integrated circuits and the like, showing the vestibule block of the present invention.

FIG. 1 illustrates a furnace 20 used in the steps of diffusion, oxidation, polycrystalline and amorphous silicon deposition and the like, in state-of-the-art semiconductor manufacturing processes. Briefly summarized, such a typical state-of-the-art furnace comprises an outer cover 22 usually made of metal, interior walls 24 which comprise ceramic or refractory materials, and a vestibule box 26 which may be constructed of metal. In some state-of-the art furnaces the vestibule box 26 is omitted. Two oppositely disposed walls 24 of the furnace 20 have a cylindrical opening into which a vestibule block 28 is inserted. Although the vestibule block 28 illustrated in FIG. 1 is novel because its surface has been treated in accordance with the present invention, the basic configuration of the vestibule block 28 is conventional. Thus, the vestibule block 28 has a step-down portion 30 and an annular opening or annulus 32, into which a quartz (or like) diffusion tube 34 is inserted. A diffusion tube support collar 36 acts as particulate free packing material, in effect as a gasket, between the annulus 32 and the diffusion tube 34. The support collar 36 is preferably constructed in accordance with the teachings of U.S. Pat. No. 4,278,422, the specification of which is hereby incorporated by reference. The diffusion tube 34 itself is conventional, and contains a large number of silicon wafers (not shown) as intermediates in the semi-conductor manufacturing process. An electrical heating coil 38 is disposed around the diffusion tube 34.

It should be specifically understood in connection with the description of the present invention, that FIG. 1 illustrates a typical furnace 20 used in the semi-conductor manufacturing process, and that description of the furnace 20 is not intended to limit the present invention. For example, furnaces are known in the art where the diffusion tube 34 is disposed in a vertical position, and the present invention may be practiced in connection with such furnaces as well.

Figure 2:
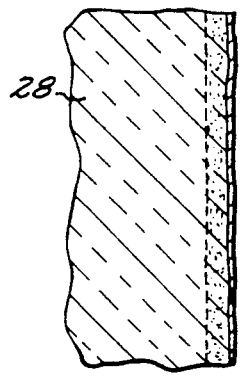
FIG. 2 is an enlarged cross-sectional, partial schematic view of the vestibule block, showing the area indicated at 2 on FIG. 1.

A prior art vestibule block to be treated in accordance with the present invention to provide the novel abrasion resistant vestibule block 28 of the invention, is commercially available in the United States. The conventional vestibule block is made of ceramic or refractory material. The conventional interior walls 24 of the furnace 20 are also made of ceramic or refractory material. A serious disadvantage of conventional prior art vestibule blocks and of prior art interior furnace walls is that they generate particulate matter which is highly deleterious to the semi-conductor manufacturing process. In sharp contrast, the vestibule block 24 of the present invention, shown on FIGS. 1 and 2, has a treated surface 38 which generates practically no particulate matter at all during normal use, and which in abrasions tests has been shown to generate about 50 times (or greater number) less particles than prior art refractory or ceramic vestibule blocks. The same is true with respect to refractory or ceramic interior furnace walls treated in accordance with the present invention. For the sake of simplicity of this description, the process of treating prior art vestibule blocks and interior surface walls in accordance with the present invention will be further described with respect to vestibule blocks. It should be, however, kept in mind that the description is also applicable to ceramic or refractory interior walls of a diffusion furnace.

Thus, in accordance with the present invention, a prior art commercially available refractory or ceramic vestibule block is treated with a suspension of glass frit consisting essentially of calcium alumino silicate. The glass frit of calcium alumino silicate employed in the present invention is commercially available from Ferro Corporation of Cleveland Ohio, under the designation "High Temperature Dielectric EG 2705 glass type calcium alumino silicate. This material has an average particle size of approximately 4±0.5 micron, and the following further properties (represented by its manufacturer) shown in Table 1.

TABLE 1

| | |
|---|---|
| Thermal Expansion ($\times 10^{-7}$/°C., 25–300° C.) | 69.0 |
| Softening Point | 925° C. |
| Density (g/cc) | 3.0 |
| Transition Temperature | 775° C. |
| Dielectric Constant (1 MHz, 25° C.) | 7.8 |
| Loss Tangent (1 MHz, 20° C.) | 0.2% |
| Typical Firing Temperature/Time | 1300° C. 10–30 min. |

Figure 3:
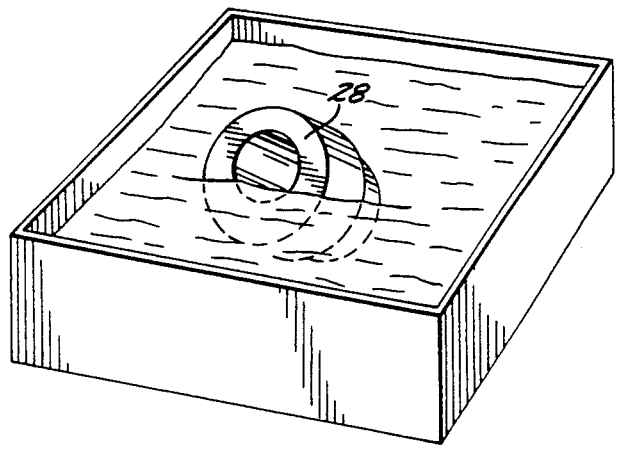
FIG. 3 is a schematic view showing a step in the process of applying a surface treating material to the vestibule block by dipping.
Figure 4:
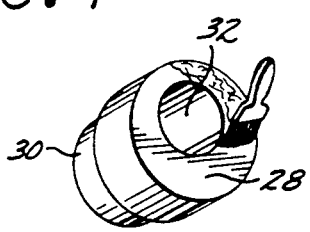
FIG. 4 is a schematic view showing a step in the process of applying a surface treating material to the vestibule block by brushing.
Figure 5:
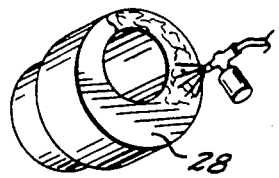
FIG. 5 is a schematic view showing a step in the process of applying a surface treating material to the vestibule block by spraying.

The glass frit of calcium alumino silicate is suspended in a suitable solvent, preferably water, by stirring, preferably in proportions of approximately 1 to 1 (glass frit to water, by volume). The suspension is preferably agitated before and during use to prevent settling. A preferred method of applying the suspension to the entire exterior surface of a prior art vestibule block, is by spraying, as is schematically shown on FIG. 5. Other methods for applying this suspension can also be employed, such as dipping the vestibule block in the suspension (as shown in FIG. 3), or brushing the suspension on the vestibule block (as shown in FIG. 4). During application of the suspension a thin layer of the glass frit is deposited on the surface of the vestibule block. The ratios of glass frit to carrying liquid (preferably water) in the suspension is not critical as long as the desired goal is achieved, that is that there is sufficient glass frit in the suspension so as to deposit a substantial but thin layer of the same, on the surface of the vestibule block. The particle size of the glass frit is also not considered critical for the practice of the invention, as long as a suitable suspension can be achieved; preferably the particle size is in the 1 to 10 micron range, most preferably it is about 4±0.5 micron as noted in connection with the glass frit employed in the preferred embodiment. It is important in connection with the chemical composition of the glass frit that it should be relatively free of contamination by components containing phosphorous, boron or sodium, because the presence of these elements on the vestibule block 28 (or in the interior walls 24 of the furnace 20) can cause undesirable contamination of the semi-conductors made in the furnace 20.

Figure 6:
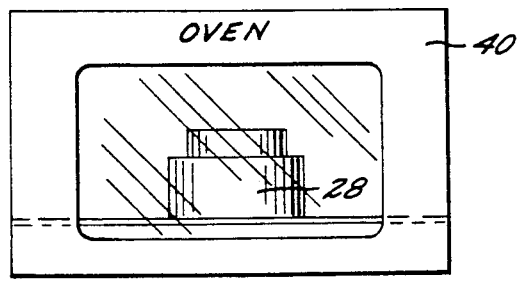
FIG. 6 is a schematic view showing a step in the process of heating the vestibule block in an oven.

After having deposited the calcium alumino silicate glass frit on the vestibule block, the vestibule block is heated to a temperature which is above the transition temperature of the glass frit, in the herein described example the treated vestibule block is heated above approximately 775° C. The heating is best accomplished by placing the vestibule block in a kiln or oven 40 (schematically shown on FIG. 6). At the time the vestibule block is placed into the oven 40, preferably the oven 40 is at ambient or close to ambient temperature. The oven is then turned on and heated until the inside temperature climbs above the transition temperature, in the preferred process up to approximately 1250° to 1300° C. Thereafter, the oven is allowed to cool, and the vestibule block 28 is removed. Experience has shown that a single treatment of a prior-art vestibule block in the above described manner is sufficient to make the surface 38 substantially less prone to particle generation than in the prior art. Accordingly, the invention can be practiced by a single application of the glass frit and subsequent heating above the transition temperature in the above-described manner. The vestibule block 28 which has been treated in the above-described manner has an exterior surface comprising a thin layer of calcium alumino silicate which has been heated above its transition point. Instead of calcium alumino silicate other alkali earth metal alumino silicates, such as magnesium alumino silicate can also be used in accordance with the invention.

In accordance with the preferred process of the invention, however, the application of a suspension of glass frit and subsequent heating is repeated once more, and optionally may be repeated several times.

Still further, in accordance with the most preferred process of the invention an aqueous colloidal dispersion of alumina (aluminum hydroxide/oxide) is applied to a prior art vestibule block before the first application of the glass frit. The colloidal alumina solution used for this purpose can be purchased directly from PQ corporation of Valley Forge Pennsylvania. The colloidal alumina dispersion used in the preferred embodiment has an average particle size of 0.05 micron, and a concentration of approximately 23.5 per cent (by weight) of alumina in water. The dispersion also contains nitric acid in sufficient amount (approximately 0.1 to 1.0 per cent by weight) to result in a pH of approximately 4.0. Acidic pH is necessary to keep the alumina in colloidal dispersion.

The colloidal alumina dispersion is applied to the vestibule block by dipping, brushing spraying or the like, as is described in connection with applying the suspension of glass frit to the vestibule block. Thereafter the treated vestibule block is heated in a kiln or oven 40 in the same manner as described above. It is also possible in accordance with the present invention to repeat the application of alumina followed by firing, once, or several times.

Figure 7:
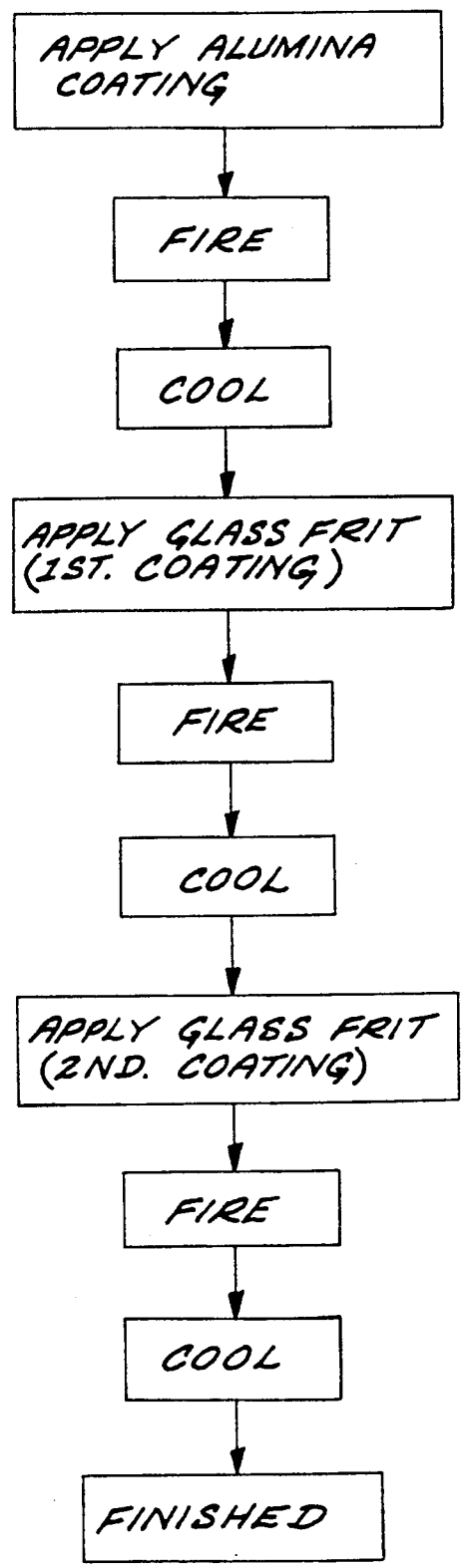
FIG. 7 is a block diagrammatic view showing the preferred method of practicing the process of the present invention.

FIG. 7 of the appended drawings illustrates the process of the invention, as it is performed in the most preferred manner. Thus, in accordance with this preferred embodiment the colloidal alumina solution is applied by spraying, the vestibule block is fired in the oven 40 as described above, and is allowed to cool. Thereafter, the above-described suspension of glass frit is applied to the vestibule block, the vestibule block is fired in the oven 40, and allowed to cool again. Then, the application of glass frit followed by firing is repeated once more.

The vestibule blocks and interior furnace walls made in accordance with the present invention have an exterior surface which is highly abrasion resistant, in the sense that during normal use virtually no particulate matter is generated on these surfaces. Moreover, in tests performed by deliberately scraping (abrading) the surface of the vestibule blocks of the invention and also of prior art vestibule blocks, it was found that the vestibule blocks of the invention generate significantly less (50 or more times less) particulate matter than vestibule blocks of the prior art.

Several modifications of the present invention may become readily apparent to those skilled in the art in light of the foregoing disclosure. Therefore, the scope of the present invention should be interpreted solely from the following claims, as such claims are read in light of the disclosure.

What is claimed is:

1. A vestibule block to be utilized in a furnace for making semi-conductors and integrated circuits and, the vestibule block comprising ceramic material and having a abrasion resistant outer surface comprising an alkali earth metal alumino silicate which has been heated above its transition point.

2. A vestibule block as defined in claim 1 wherein the outer surface comprises calcium alumino silicate.

3. A vestibule block as defined in claim 1 wherein the abrasion resistant outer surface further comprises alumina which has been treated above 1000° C.

4. A vestibule block as defined in claim 2 wherein the abrasion resistant outer surface further comprises alumina which has been treated above 1000° C.

5. An interior wall in a furnace for making semi-conductors and integrated circuits and the interior wall comprising ceramic material and having a abrasion resistant outer surface comprising an alkali earth metal alumina silicate which has been heated above its transition point.

6. An interior wall as defined in claim 5 wherein the outer surface comprises calcium alumino silicate.

7. An interior wall as defined in claim 5 wherein the abrasion resistant outer surface further comprises alumina which has been treated above 1000° C.

8. An interior wall as defined in claim 6 wherein the abrasion resistant outer surface also comprises alumina which has been treated above 1000° C.

9. A vestibule block to be utilized in a furnace for making semi-conductors and integrated circuits and the vestibule block comprising ceramic material and having a abrasion resistant outer surface which has been prepared by the process comprising the steps of:

applying a suspension of glass frit consisting essentially of calcium alumino silicate and an solvent to the surface of the vestibule block, and heating the vestibule block having the suspension applied to its surface above the transition temperature of the glass frit.

10. A vestibule block as defined in claim 9 which is prepared in a process where the steps of applying a suspension of glass frit and thereafter heating the vestibule block, are repeated.

11. A vestibule block as defined in claim 9 which is prepared in a process comprising the additional steps of applying a colloidal suspension of alumina to the surface of the vestibule block and thereafter heating the vestibule block having the applied alumina to at least approximately 1250° C., said steps of applying the colloidal suspension of alumina and heating the vestibule block having the applied alumina being performed before the step of applying the suspension of glass frit.

12. An interior wall to be utilized in a furnace for making semi-conductors and integrated circuits and the interior wall comprising ceramic material and having a abrasion resistant outer surface which has been prepared by the process comprising the steps of:

applying a suspension of glass frit consisting essentially of calcium alumino silicate and an inert solvent to the surface of the interior wall, and heating the interior wall having the suspension applied to its surface above the transition temperature of the glass frit.

13. An interior wall as defined in claim 12 which is prepared in a process where the steps of applying a suspension of glass frit and thereafter heating the interior wall, are repeated.

14. An interior wall as defined in claim 12 which is prepared in a process comprising the additional steps of applying a colloidal suspension of alumina to the surface of the interior wall and thereafter heating the interior wall having the applied alumina to at least approximately 1250° C., said steps of applying the colloidal suspension of alumina and heating the interior wall having the applied alumina being performed before the step of applying the suspension of glass frit.

* * * * *